US012759543B2

(12) United States Patent
Song et al.

(10) Patent No.: US 12,759,543 B2
(45) Date of Patent: Oct. 13, 2026

(54) METHOD AND SYSTEM FOR ESTIMATING LANE CHANGING INTENTION OF TARGET VEHICLE

(71) Applicant: HL KLEMOVE CORP., Incheon (KR)

(72) Inventors: Seungmok Song, Pyeongtaek (KR); Eunsan Jo, Pyeongtaek (KR); Hanshin Cho, Pyeongtaek (KR); Daichang Ro, Pyeongtaek (KR); Dayeon Seo, Pyeongtaek (KR); Junhyung Cha, Pyeongtaek (KR)

(73) Assignee: HL KLEMOVE CORP., Incheon (KR)

( * ) Notice: Subject to any disclaimer, the term of this patent is extended or adjusted under 35 U.S.C. 154(b) by 226 days.

(21) Appl. No.: 18/663,305

(22) Filed: May 14, 2024

(65) Prior Publication Data

US 2025/0187594 A1 Jun. 12, 2025

(30) Foreign Application Priority Data

Dec. 11, 2023 (KR) ........................ 10-2023-0178633

(51) Int. Cl.
*B60W 30/095* (2012.01)
*B60W 30/09* (2012.01)
*B60W 40/02* (2006.01)

(52) U.S. Cl.
CPC .......... *B60W 30/095* (2013.01); *B60W 30/09* (2013.01); *B60W 40/02* (2013.01); *B60W 2420/40* (2013.01); *B60W 2554/4045* (2020.02); *B60W 2556/00* (2020.02)

(58) Field of Classification Search
CPC .... B60W 30/095; B60W 30/09; B60W 40/02; B60W 2420/40; B60W 2554/4045; B60W 2556/00; B60W 30/0956; B60W 30/18163; B60W 40/04; B60W 2554/802; B60W 10/04; B60W 10/18; B60W 10/20; B60W 2420/403; B60W 2420/408; B60W 2554/4046; B60W 2554/4049; B60W 2554/804
See application file for complete search history.

(56) References Cited

U.S. PATENT DOCUMENTS 9,701,307 B1 * 7/2017 Newman ............... B60W 30/09
2015/0025784 A1 * 1/2015 Kastner .................. G08G 1/166
701/119
2022/0343762 A1 * 10/2022 Alvarez ................ B60W 50/14
2022/0375349 A1 * 11/2022 Xue .................... G06F 18/2411

* cited by examiner

*Primary Examiner* — Jason Holloway
(74) *Attorney, Agent, or Firm* — Harvest IP Law, LLP

(57) ABSTRACT

A method and system for estimating lane changing intention of a target vehicle is provided, and a method for estimating lane changing intention of a target vehicle according to an embodiment of the present disclosure comprises: detecting the target vehicle and at least one peripheral vehicle of the target vehicle using at least one sensor installed at a host vehicle; accumulating driving risk data of the target vehicle with respect to at least one peripheral vehicle while the target vehicle is driving straight; determining whether the driving risk data has been accumulated for a predetermined time; if the driving risk data has been accumulated for the predetermined time, generating a risk adaptability model based on the accumulated driving risk data; estimating the lane changing intention of the target vehicle based on the generated risk adaptability model; and controlling the host vehicle based on the lane changing intention of the target vehicle.

20 Claims, 7 Drawing Sheets

METHOD AND SYSTEM FOR ESTIMATING LANE CHANGING INTENTION OF TARGET VEHICLE

CROSS-REFERENCE TO RELATED APPLICATION

This application claims the benefit of and priority to Korean Patent Application No. 2023-0178633 filed on Dec. 11, 2023, the entire disclosures of which are incorporated herein by reference.

TECHNICAL FIELD

The present disclosure relates to a method and system for estimating the lane changing intention of a target vehicle. More specifically, the present disclosure relates to a method and system for estimating the lane changing intention of the target vehicle to plan a safe driving route by estimating the lane changing intention of the target vehicle in the vicinity of a host vehicle while the host vehicle is driving.

BACKGROUND

In a vehicle, a driver assistance system provides assistance to the driver while driving in the vehicle for the driver's convenience.

In order to provide such a driver assistance system, it is necessary to obtain various information from surrounding vehicles, and accordingly, developments are continuously taking place regarding sensors and systems that can obtain various information such as a location, a speed, a rotational angle, a length and a width of a surrounding vehicle. For example, a vehicle may obtain information about surrounding vehicles using various sensors such as a front camera, a front radar, corner radars, and a lidar.

Meanwhile, for example, while a host vehicle is driving in a driving lane, there may be a case where a surrounding vehicle driving in a neighboring lane changes its lane to the driving lane of the host vehicle and moves in front of the host vehicle.

In this situation, since the driving of the host vehicle is interrupted by the surrounding vehicle that has changed the lane, even if the driver assistance system or the autonomous driving mode is activated, situations may occur that the host vehicle should brake quickly or rapidly or should change the driving direction. In this case, not only may the driver of the host vehicle feel discomfort due to the surrounding vehicle changing the lane, but also a risk of collision with the surrounding vehicle may occur.

Therefore, by accurately determining the lane changing intention of the vehicle surrounding the host vehicle, various driver assistance functions can be provided to the driver of the host vehicle while reducing discomfort in driving the host vehicle based on the determination result.

Meanwhile, according to the prior art, in determining the lane changing intention of the surrounding vehicle, it was common to estimate the lane changing intention of the surrounding vehicle using a location, a speed, a heading angle, etc. of the surrounding vehicle.

However, in estimating lane changing intention using the position, the speed, the heading angle, etc. of the surrounding vehicle, since the individual habits of the driver of the target vehicle (the surrounding vehicle) are not taken into consideration, there was a problem in that it is difficult to individually determine the lane changing intention for each of surrounding vehicles with different drivers.

Accordingly, there is a need for a method and system for estimating the lane changing intention of the target vehicle to plan a safer and less heterogeneous driving route for the host vehicle in the driver assistance system or in the autonomous driving system, by individually identifying the lane changing intention of vehicles surrounding the host vehicle according to each driver's tendency.

SUMMARY

The present disclosure is to solve the above-mentioned problems of the prior art, and the object of the present disclosure is to provide a method and system for estimating the lane changing intention of a target vehicle, which estimates the lane changing intention of the target vehicle based on a probability-based risk adaptability model.

However, the technical problem to be achieved by the embodiments of the present disclosure is not limited to the technical problems described above, and other technical problems may exist.

As a technical means for achieving the above technical problem, a method for estimating lane changing intention of a target vehicle according to an embodiment of the present disclosure comprises: detecting the target vehicle; accumulating driving risk data with respect to at least one peripheral vehicle of the target vehicle while the target vehicle is driving straight; determining whether the driving risk data has been accumulated for a predetermined time; if the driving risk data has been accumulated for the predetermined time, generating a risk adaptability model based on the accumulated driving risk data; and estimating the lane changing intention of the target vehicle based on the generated risk adaptability model.

Further, the detecting of the target vehicle may be performed by detecting a peripheral vehicle in front or in front side of a host vehicle using at least one sensor installed at the host vehicle.

Further, the risk adaptability model may be a probability-based model, and the driving risk data may be data based on a distance and a relative speed between the target vehicle and the at least one peripheral vehicle while the target vehicle is driving straight.

Further, the predetermined time may be 5 seconds or more.

Further, the at least one peripheral vehicle may be in plural number, and the driving risk data for the at least one peripheral vehicle may include driving risk data for each of the plurality of peripheral vehicles of the target vehicle.

Further, the estimating of the lane changing intention may comprise determining whether newly obtained driving risk data is fit for the risk adaptability model, and estimating that the target vehicle does not have lane changing intention if the newly obtained driving risk data is fit for the risk adaptability model.

Further, if it is detected that the target vehicle changed a driving lane, newly obtained driving risk data may not be accumulated.

Further, if the host vehicle is unable to track the target vehicle, estimating the lane changing intention of the target vehicle may be terminated.

Further, if the host vehicle is unable to track the target vehicle and a new target vehicle is detected and tracked, the risk adaptability model may be set to an initial value for the new target vehicle.

Further, if the host vehicle is able to track the target vehicle, the estimating of the lane changing intention of the target vehicle may be repeatedly performed.

The method for estimating lane changing intention of the target vehicle may further comprise controlling the host vehicle based on the lane changing intention of the target vehicle estimated in the estimating of the lane changing intention.

A system for estimating lane changing intention of a target vehicle according to an embodiment of the present disclosure comprises: at least one sensor configured to detect the target vehicle; and a controller comprising a processor configured to estimate the lane changing intention of the target vehicle and a vehicle controller configured to control a host vehicle based on the estimated lane changing intention, wherein the processor is configured to: accumulate driving risk data for at least one peripheral vehicle of the target vehicle while the target vehicle is driving straight; determine whether the driving risk data has been accumulated for a predetermined time; determine whether the driving risk data has been accumulated for the predetermined time; generate a risk adaptability model based on the accumulated driving risk data if the driving risk data has been accumulated for the predetermined time; and estimate the lane changing intention of the target vehicle based on the generated risk adaptability model.

Further, the least one sensor may comprise at least one of a front camera, a front radar, and a plurality of corner radars installed at the host vehicle.

Further, the risk adaptability model may be a probability-based model, and the driving risk data may be data based on a distance and a relative speed between the target vehicle and the at least one peripheral vehicle while the target vehicle is driving straight.

Further, the predetermined time may be 5 seconds or more.

Further, the processor may be configured to determine whether newly obtained driving risk data is fit for the risk adaptability model, and estimate that the target vehicle does not have lane changing intention if the newly obtained driving risk data is fit for the risk adaptability model.

Further, if the at least one sensor detected that the target vehicle has changed a driving lane, the processor may not accumulate newly obtained driving risk data.

Further, if the target vehicle is unable to be tracked by the at least one sensor, the processor may terminate estimating lane changing intention of the target vehicle.

Further, if the target vehicle is unable to be tracked by the at least one sensor and a new target vehicle is detected and tracked, the processor may be configured to set the risk adaptability model to an initial value for the new target vehicle.

Further, the vehicle controller may be connected with an acceleration apparatus, a braking apparatus and a steering apparatus, and the vehicle controller may be configured to control the host vehicle through acceleration, deceleration, or steering control based on the lane changing intention of the target vehicle estimated by the processor.

The above-described means for solving the problem is only exemplary and should not be construed as limiting the present disclosure. In addition to the exemplary embodiments described above, additional embodiments may exist in the drawings and the following detailed description.

According to the above-described problem-solving means of the present disclosure, since the lane changing intention can be estimated with high reliability according to the probability-based risk adaptability model, it is possible to provide a method and system for estimating the lane changing intention of the target vehicle for safer and less heterogeneous driving route planning.

In addition, according to the present disclosure, since the lane changing intention can be estimated by generating different risk adaptability models depending upon a target vehicle, it is possible to provide a method and system for estimating the lane changing intention of the target vehicle taking into account the habits of the driver of the target vehicle.

However, the effects obtainable from the present disclosure are not limited to the effects described above, and other effects may exist.

DETAILED DESCRIPTION

Figure 1:
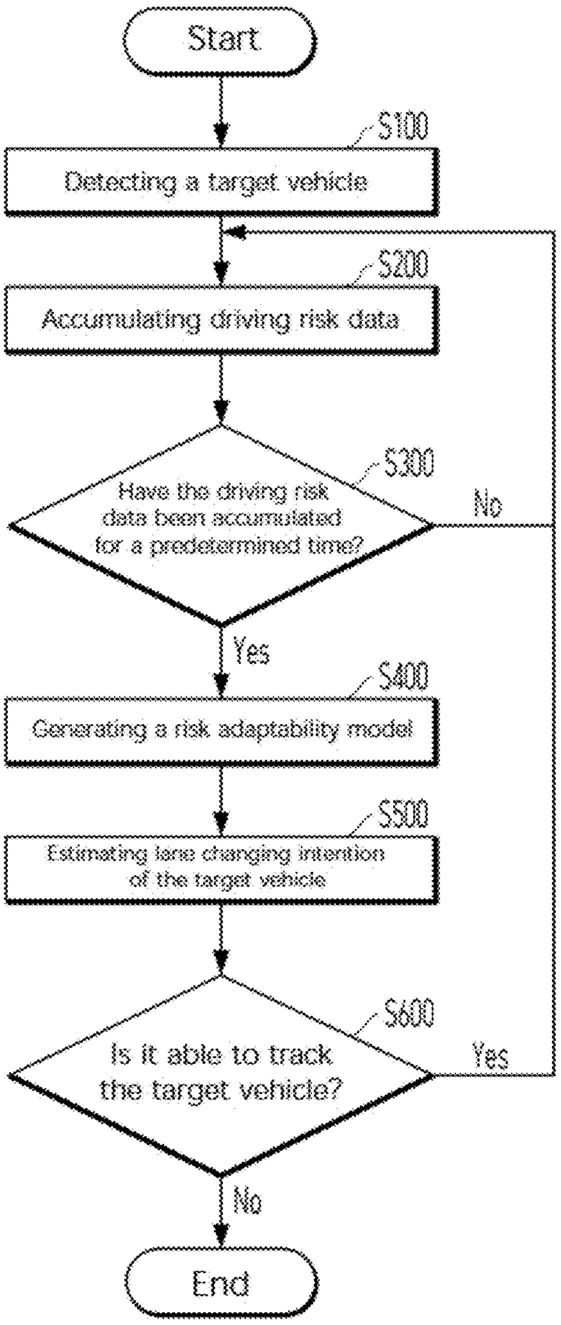
FIG. 1 is a control flowchart illustrating a method for estimating lane changing intention of a target vehicle according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for estimating the lane changing intention of a target vehicle to plan a safe and less heterogeneous driving route by estimating the lane changing intention of other vehicles surrounding a host vehicle.

FIG. 1 is a control flowchart illustrating a method for estimating lane changing intention of a target vehicle according to an embodiment of the present disclosure.

Referring to FIG. 1 of the present disclosure, the method for estimating the lane changing intention of the target vehicle according to the embodiment of the present disclosure may include a target vehicle detection step S100 of detecting a target vehicle around the host vehicle.

More specifically, a target vehicle driving around the host vehicle may be detected by at least one sensor installed in the host vehicle, for example, a front camera, a front radar, and/or at least one corner radar. At least one sensor may be a plurality of sensors, and the target vehicle may be detected by fusing the detection results of the plurality of sensors. Additionally, the sensors are not limited to those mentioned above and may include other types of sensors such as lidar sensors and ultrasonic sensors.

For example, the target vehicle detection step S100 may be performed by detecting a surrounding vehicle located in front or in front side (front left or front right side) of the host vehicle using at least one sensor installed at the host vehicle. The reason for detecting a surrounding vehicle in front or in front side of the host vehicle as a target vehicle is because there is a high possibility that the driving of the host vehicle may be affected when the surrounding vehicle in front or in front side of the host vehicle changes the lane.

If the target vehicle is detected by at least one sensor, a driving risk data accumulating step S200 of accumulating driving risk data of the target vehicle with respect to at least one peripheral vehicle may be performed while the target vehicle is driving straight.

Meanwhile, the driving risk data of the target vehicle with respect to at least one peripheral vehicle may be obtained based on a distance and a relative speed between the target vehicle and the at least one peripheral vehicle.

Specifically, the driving risk data may be data based on the distance and the relative speed, such as Time To Collision (TTC) between the target vehicle and the at least one peripheral vehicle. Alternatively, the driving risk data may be data based on a Responsibility-Sensitive Safety (RSS) model.

Meanwhile, according to the embodiment of the present disclosure, after the step of accumulating driving risk data S200, a step of determining whether the driving risk data has been accumulated for a predetermined time may be performed (S300).

The reason for accumulating driving risk data of the target vehicle with respect to at least one peripheral vehicle for the predetermined time is to secure sufficient reliability in estimating the lane changing intention of the target vehicle based on probability. The predetermined time may be set by the driver, and preferably, the predetermined time may be 5 seconds or more.

If the driving risk data has been accumulated for the predetermined time ('Yes' in S300), a step of generating a risk adaptability model based on the accumulated driving risk data may be performed (S400).

The risk adaptability model is a probability-based model. For example, the risk adaptability model may be a probability model with a Gaussian distribution, that is, a normal distribution. The risk adaptability model can be described as probability-based modeling of accumulated data, which quantifies how much risk the target vehicle takes from peripheral vehicles while driving straight.

After generating the probability-based risk adaptability model, a lane changing intention estimation step S500 may be performed to estimate the lane changing intention of the target vehicle based on the risk adaptability model.

Figure 2:
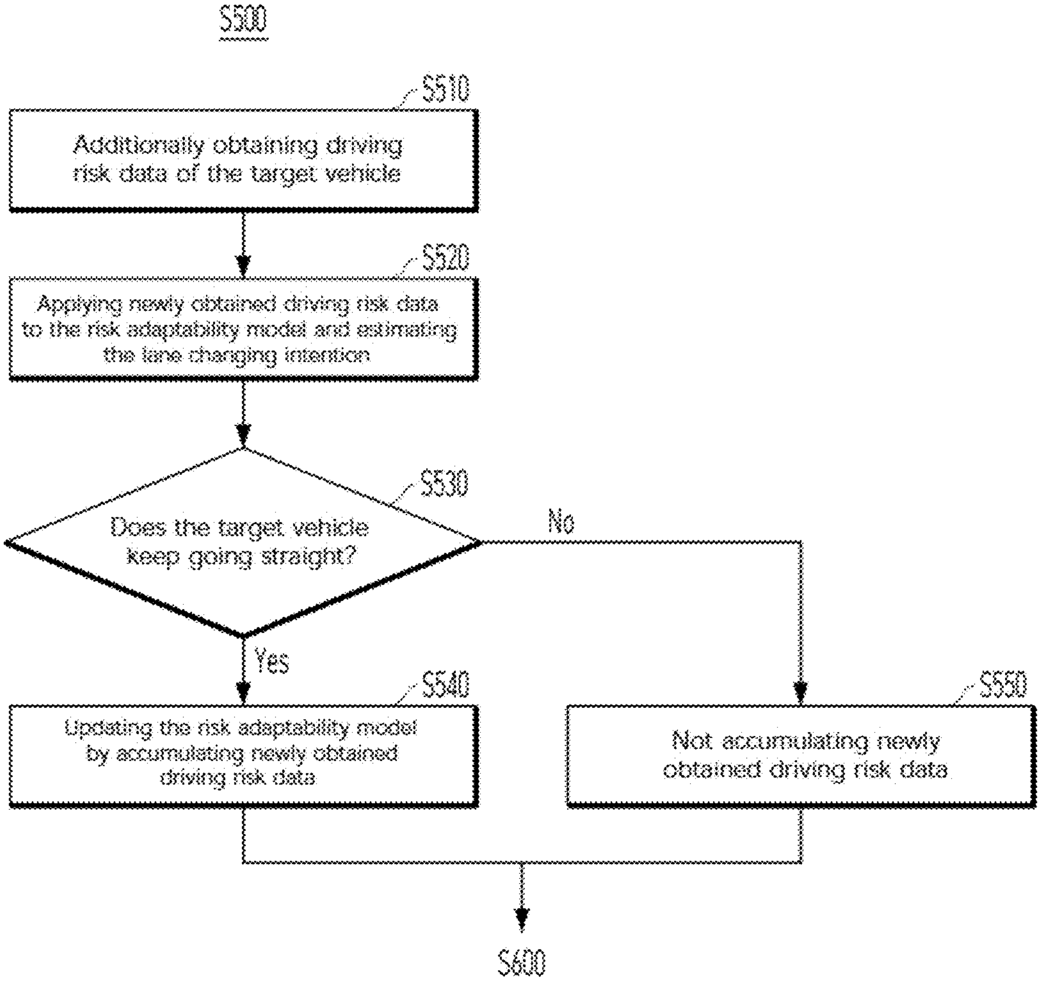
FIG. 2 is a flowchart illustrating in more detail the step of estimating the lane changing intention of the target vehicle in the method for estimating the lane changing intention of the target vehicle according to the embodiment of the present disclosure.

FIG. 2 is a flowchart illustrating in more detail the step of estimating the lane changing intention of the target vehicle in the method for estimating the lane changing intention of the target vehicle according to the embodiment of the present disclosure.

Looking at the lane changing intention estimation step S500 in more detail with reference to FIG. 2, if the driving risk data of the target vehicle is sufficiently accumulated for the predetermined time (about 5 seconds or more), a probability-based risk adaptability model may be generated, and then, driving risk data of the target vehicle may be additionally obtained (S510).

Accordingly, it is possible to estimate the lane changing intention of the target vehicle by applying the newly obtained driving risk data to the generated risk adaptability model (S520).

Specifically, based on the risk adaptability model generated to form a normal distribution (Gaussian distribution) based on the accumulated data (driving risk data), it can be determined whether the newly obtained driving risk data is fit for the risk adaptability model. If it is fit, it may be assumed that the target vehicle has no intention to change the driving lane, and if it is not fit, it may be assumed that the target vehicle has intention to change the driving lane. Here, the concept of 'fit' may refer to whether the newly obtained driving risk data is within the range of the normal distribution curve formed by accumulating driving risk data before the new driving risk data is obtained. That is, if the newly obtained driving risk data is out of the range of the normal distribution curve, it would be said that the newly obtained driving risk data does not fit for the risk adaptability model.

This risk adaptability model may represent the habits of the driver of the target vehicle. Specifically, since the risk adaptability model is a model that accumulates driving risk data when the target vehicle drives without changing the lane, it may represent a state where the target vehicle maintains straight driving while taking the associated driving risks. Therefore, depending upon the habits or driving styles of the driver of the target vehicle, the tendency of the corresponding driving risk data may be different.

For example, if the driver of the target vehicle has a habit of driving straight while maintaining a close distance to a vehicle in front of the target vehicle, even in case that the driving risk of the target vehicle measured by the host vehicle (e.g., the risk of collision with the peripheral vehicle according to the TTC) is higher than driving risks of normal drivers, it is highly likely that the target vehicle will keep going straight. On the other hand, if the driver of the target vehicle has a habit of driving straight while maintaining a longer distance from a vehicle in front of the target vehicle than normal drivers, the possibility of changing the lane may be higher even in case that the driving risk of the target vehicle is not high.

Since it may be said that the risk adaptability model is an accumulation of the driving risk data while driving straight according to the driver's habits, if sufficient data is accumulated, by applying the newly obtained data to the risk adaptability model, it is possible to estimate the lane changing intention of the driver of the target vehicle individually based on the probability.

Next, according to the embodiment of the present disclosure, a step of determining whether the target vehicle actually keeps driving straight may be performed (S530). According to the present disclosure, since data is accumulated in the risk adaptability model only when the target vehicle keeps driving straight, it is not preferable to accumulate newly obtained driving risk data if the target vehicle does not keep driving straight (in case of changing the lane).

Therefore, only if the target vehicle keeps going straight ('Yes' in S530), the risk adaptability model may be updated by accumulating newly obtained driving risk data (S540). If the target vehicle does not keep going straight ('No' in S530), newly obtained driving risk data may not be accumulated (S550).

Meanwhile, referring back to FIG. 1, in order to plan a safe driving route even after the step of estimating the lane changing intention of the target vehicle S500, it may be required to continuously estimate the lane changing intention of the target vehicle while the host vehicle is driving in the lane. Therefore, if the target vehicle is able to be tracked, it is required to continuously estimate the lane changing intention of the target vehicle.

Accordingly, a step of determining whether the target vehicle is able to be tracked may be performed (S600). If the target vehicle is out of the field of view (FOV) of the host vehicle or the host vehicle is unable to track the target vehicle ('No' in S600), estimating the lane changing intention of the target vehicle may be terminated.

On the other hand, if the target vehicle is able to be tracked ('Yes' in S600), the driving risk data accumulation step S200, the risk adaptability model generation step S400, and the lane changing intention estimation step S500 may be performed repeatedly.

Accordingly, by updating the risk adaptability model through continuously accumulating data as long as the target vehicle keeps driving straight, and simultaneously estimating the lane changing intention by applying newly obtained driving risk data to the risk adaptability model, it is possible to more accurately estimate the lane changing intention of the target vehicle based on a more reliable probability-based model. In addition, while the steps of S100-S600 is performed, the host vehicle may be controlled based on the lane changing intention of the target vehicle, with the control of the host vehicle comprising acceleration of the host vehicle, deceleration of the host vehicle, or steering of the host vehicle, or any combination thereof.

Figure 3:
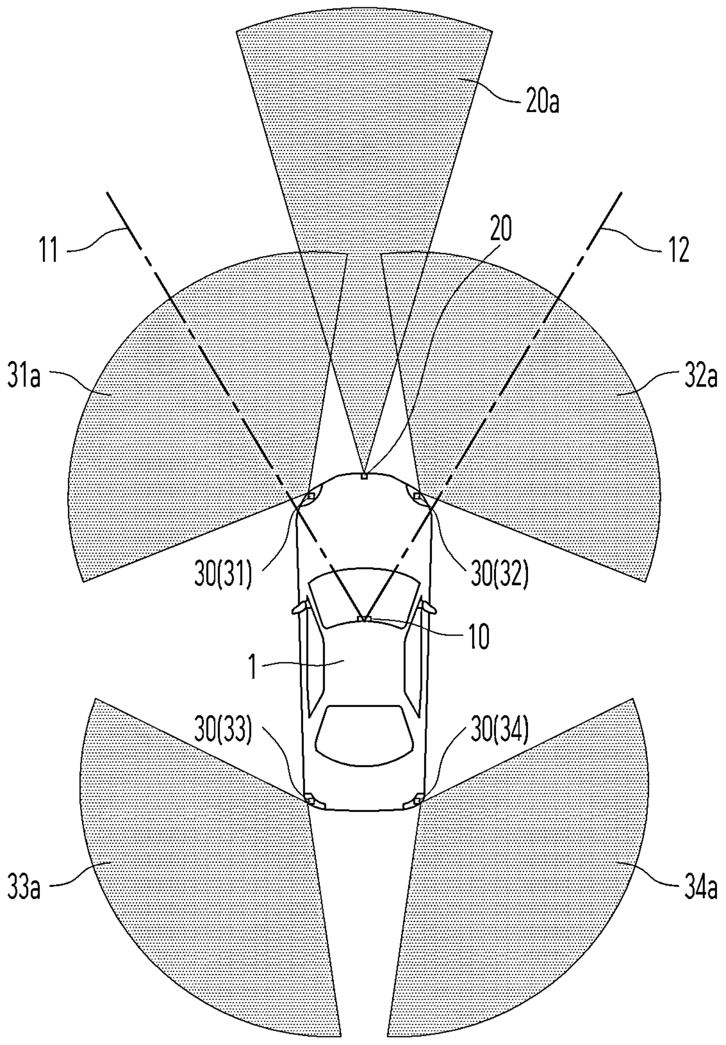
FIG. 3 is a diagram illustrating a camera and radars installed in a vehicle according to an embodiment of the present disclosure.

FIG. 3 is a diagram illustrating a camera and radars installed in a vehicle according to an embodiment of the present disclosure.

As shown in FIG. 3, the front camera 10 may be installed at the windshield of the vehicle and may have a field of view having a viewing angle formed by a left visual limit line 11 and a right visual limit line 12.

The front camera 10 may collect image data from the front of the vehicle 1 by photographing the front of the vehicle 1. The front camera 10 may include a plurality of lenses and image sensors, and the image sensor may include a plurality of photo diodes that convert light into electrical signals.

The front radar 20, which may be installed at a grill or a bumper at the front of the vehicle 1, may include a transmitting antenna that transmits radio waves toward the front and a receiving antenna that receives reflected radio waves reflected by an object in front. Further, data may be obtained from the transmitted radio wave transmitted by the transmitting antenna and the reflected radio wave received by the receiving antenna. The front radar 20 may have a detection area 20*a* at the front of the vehicle 1, and detection data by the front radar 20 may include distance information and relative speed information with respect to an object in front.

A plurality of corner radars (30; 31 to 34) may be provided at the corners of the vehicle 1. Specifically, the plurality of corner radars may include a first corner radar 31 installed at the front left side of the vehicle 1, a second corner radar 32 installed at the front right side of the vehicle 1, a third corner radar 33 installed at the rear left side of vehicle 1, and a fourth corner 34 radar installed at the rear right side of vehicle 1.

In addition, the first corner radar 31 may have a detection area 31*a* facing the front left side, the second corner radar 32 may have a detection area 32*a* facing the front right side, and the third corner radar 33 may have a detection area 33*a* facing the rear left side, and the fourth corner radar 34 may have a detection area 34*a* facing the rear right side. Each corner radar 31 to 34 may include a transmitting antenna and a receiving antenna, and may be configured to obtain radar detection data of each detection area 31*a* to 34*a*.

Figure 4:
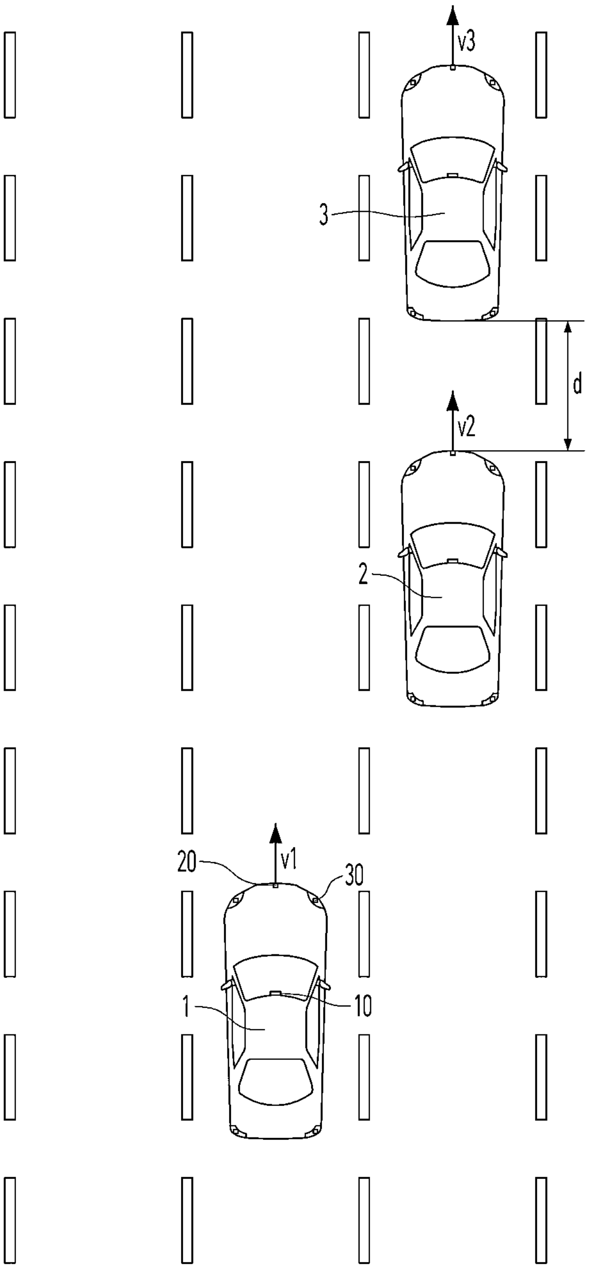
FIGS. 4 to 6 are diagrams illustrating situations in which the lane changing intention of a target vehicle is estimated according to an embodiment of the present disclosure.
Figure 5:
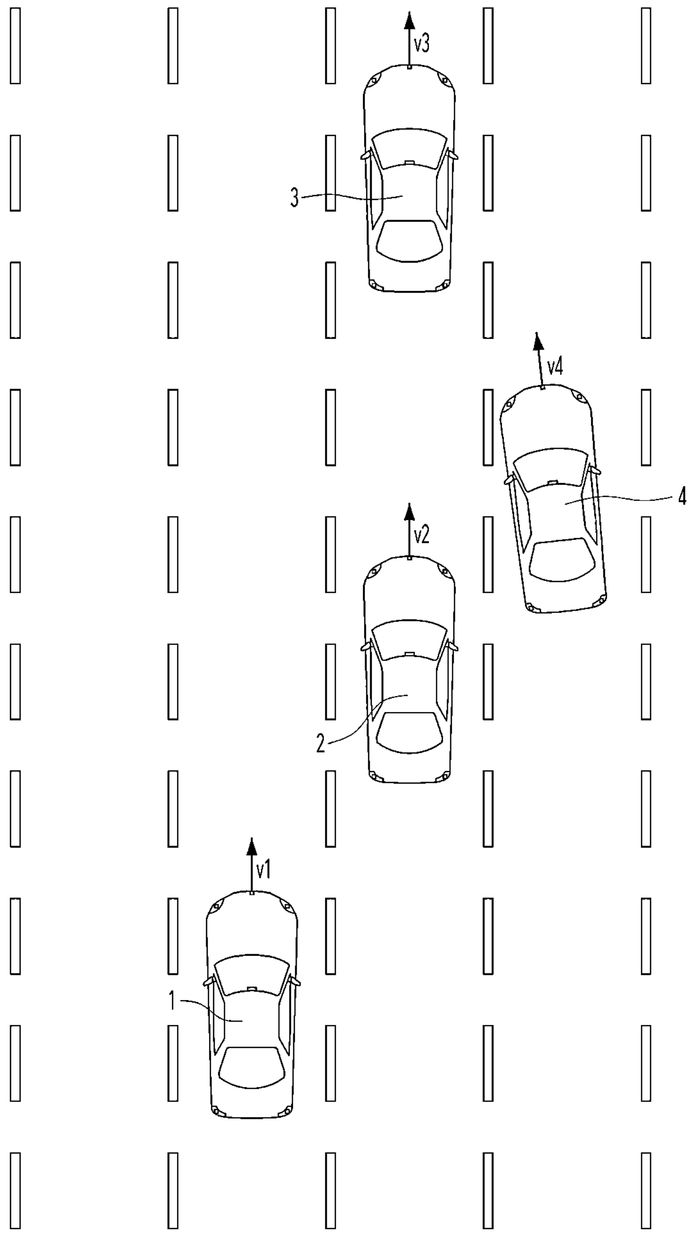
Figure 6:
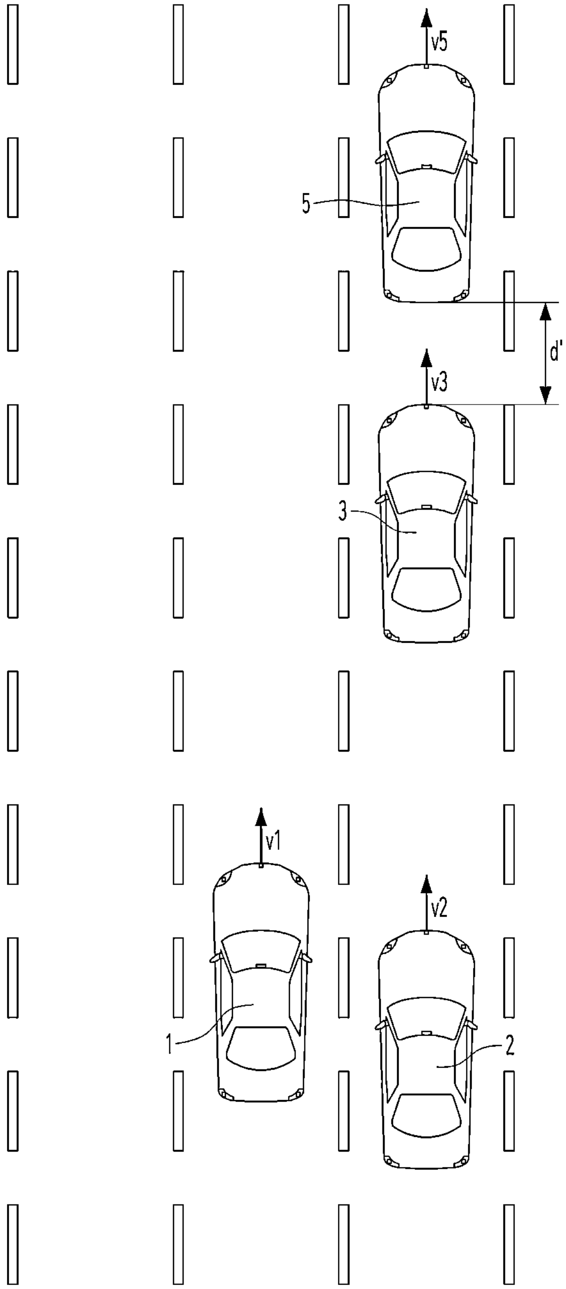

FIGS. 4 to 6 are diagrams illustrating situations in which the lane changing intention of a target vehicle is estimated according to an embodiment of the present disclosure.

Referring to FIG. 4, while the host vehicle 1 is driving, the target vehicle 2 driving in the neighboring lane may be detected by the front camera 10, the front radar 20, and/or the corner radar 30. Meanwhile, although not shown, a LiDAR sensor and/or an ultrasonic sensor may be additionally installed at the host vehicle 1, and the target vehicle 2 may be detected through the fusion of these sensors.

In addition, the host vehicle 1 may detect the first peripheral vehicle 3, which is a peripheral vehicle of the target vehicle 2. While the target vehicle 2 is driving straight, driving risk data of the target vehicle 2 may be obtained based on the detected information of the target vehicle 2 and the first peripheral vehicle 3.

This driving risk data may be driving risk data (e.g., TTC) based on, for example, the distance d between the target vehicle 2 and the first peripheral vehicle 3 and the relative speed (v3−v2) between the speed v2 of the target vehicle 2 and the speed v3 of the first peripheral vehicle 3.

Meanwhile, driving risk data of the target vehicle 2 with respect to the first peripheral vehicle 3 may be accumulated for a predetermined time (for example, approximately 5 seconds). Accordingly, a risk adaptability model having a normal distribution (Gaussian distribution) may be generated with respect to the driving risk data representing the risks that the driver of the target vehicle 2 takes while driving straight.

Afterwards, if driving risk data of the target vehicle 2 with respect to the first peripheral vehicle 3 is additionally obtained, the host vehicle 1 may determine whether the newly obtained driving risk data is fit for the risk adaptability model. If it is determined that it is fit for the risk adaptability model, it may be estimated that the driver of the target vehicle 2 has no intention of changing the lane, and if it is not fit for the risk adaptability model, it may be estimated that the driver of the target vehicle 2 has the intention of changing the lane.

FIG. 5 shows a case where at least one peripheral vehicle of the target vehicle 2 exists in plurality, which means multiple peripheral vehicles surrounding the target vehicle 2 are present. That is, if the peripheral vehicles of the target vehicle 2 include a first peripheral vehicle 3 and a second surrounding vehicle 4, the driving risk data of the target vehicle 2 may be accumulated for each of the first peripheral vehicle 3 and the second peripheral vehicle 4.

In this case, the lane changing intention of the target vehicle 2 may be estimated by generating a risk adaptability model for each of the first peripheral vehicle 3 and the second peripheral vehicle 4.

For example, in case that the second peripheral vehicle 4 (driving speed: v4) is about to enter the driving lane of the target vehicle 2, a risk adaptability model may be generated by accumulating the driving risk data of the target vehicle 2 with respect to the second peripheral vehicle 4 for a predetermined time while the target vehicle 2 is driving straight. Further, based on this, the lane changing intention of the target vehicle 2 with respect to the second peripheral vehicle 4 may be estimated. Meanwhile, the lane changing intention of the target vehicle 2 with respect to the first peripheral vehicle 3 may be estimated by the method described in FIG. 4.

FIG. 6 shows a case where the target vehicle 2 is out of the field of view of the host vehicle 1. For example, if the target vehicle 2 moves to the rear side (rear left or rear right side) of the host vehicle 1, the risk that the target vehicle 2 will interfere with the driving of host vehicle 1 by changing lanes to move in the front of the host vehicle 1 may be reduced.

Accordingly, if the target vehicle is out of the field of view of the host vehicle or the host vehicle is unable to track the target vehicle, estimation of the lane changing intention of the target vehicle may be terminated. Meanwhile, a new vehicle that was not previously recognized as a target vehicle (for example, the existing first peripheral vehicle 3) may be detected as a new target vehicle.

Accordingly, estimating the lane changing intention may be performed for the new target vehicle 3, and in this case, by setting the risk adaptability model to an initial value or by resetting the risk adaptability model to its initial state for the newly detected target vehicle 3, the driver's intention for lane changing may be estimated based on the driving habits of the driver of the new target vehicle 3. For example, driving risk data with respect to a third peripheral vehicle 5 (driving speed: v5) (e.g., data based on a distance d' and a relative speed (v5−v3)), which is a peripheral vehicle of the new target vehicle 3, may be accumulated. Based on this, a new risk adaptability model may be generated, and then, the lane changing intention of the new target vehicle 3 may be estimated depending on the suitability for the new risk adaptability model.

Figure 7:
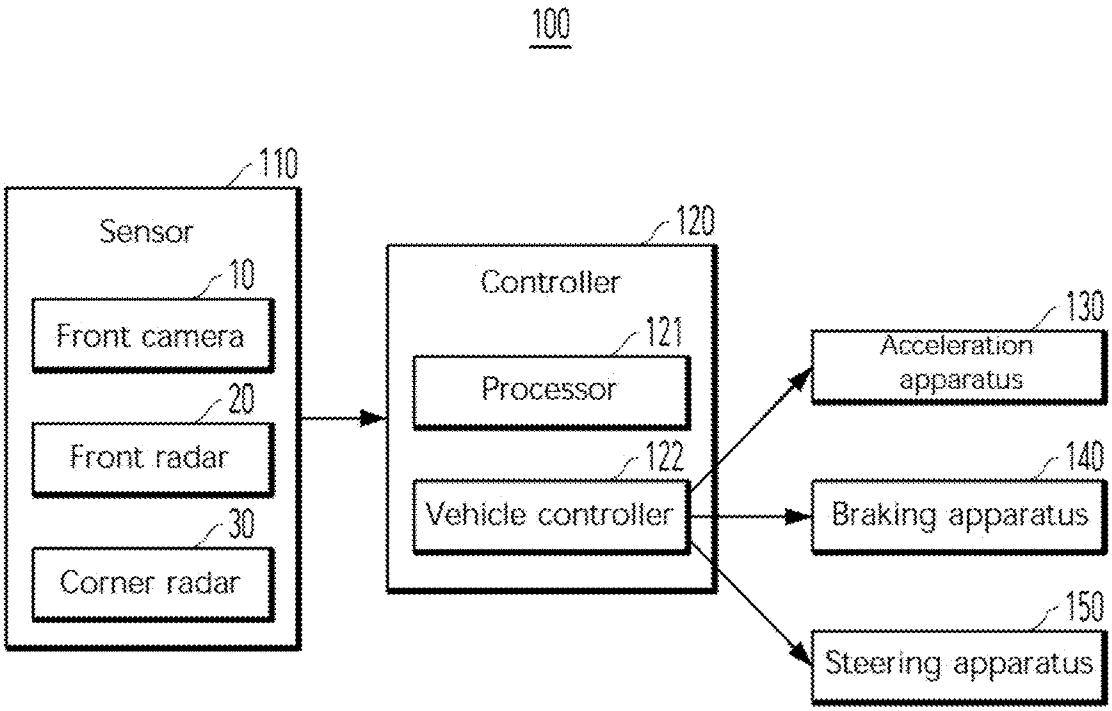
FIG. 7 is a control configuration diagram schematically illustrating the configuration of a system for estimating the lane changing intention of a target vehicle according to an embodiment of the present disclosure.

FIG. 7 is a control configuration diagram schematically illustrating the configuration of a system for estimating the lane changing intention of a target vehicle according to an embodiment of the present disclosure.

Referring to FIG. 7, a system 100 for estimating the lane changing intention of the target vehicle according to an embodiment of the present disclosure may include at least one sensor (sensor unit) 110 configured to detect a target vehicle, and a controller 120 configured to control the host vehicle. For example, the at least one sensor 110 may detect a target vehicle in front or in front side of the host vehicle.

In addition, the controller 120 may include a processor 121 configured to estimate the lane changing intention of the target vehicle and a vehicle controller 122 configured to control the host vehicle based on the estimated lane changing intention.

The at least one sensor 110 may include at least one of a front camera 10, a front radar 20, and a plurality of corner radars 30. However, it is not limited to this, and the at least one sensor 110 may include other types of sensors for detecting objects around the vehicle, such as a LIDAR sensor or an ultrasonic sensor.

In addition, the at least one sensor 110 may obtain driving risk data of the target vehicle with respect to a peripheral vehicle surrounding the target vehicle while the target vehicle is driving straight, according to the detection result of at least one sensor among the above-mentioned sensors or by fusing the detection results of a plurality of sensors.

The processor 121 of the controller 120 may accumulate the driving risk data obtained as described above and accumulate it for a predetermined time to generate a probability-based risk adaptability model. In addition, the processor 121 may estimate the lane changing intention of the target vehicle based on the generated risk adaptability model.

More specifically, the processor 121 may apply the newly obtained driving risk data to the risk adaptability model to determine the suitability. If the newly obtained driving risk data fits for the risk adaptability model, it may be estimated that the target vehicle does not have the lane changing intention, and if the newly obtained driving risk data does not fit for the risk adaptability model, it may be estimated that there exists the lane changing intention of the target vehicle.

In addition, the processor 121 does not accumulate newly obtained driving risk data if the target vehicle changed the driving lane, and if the target vehicle cannot be tracked, the processor 121 may terminate the estimation of the lane changing intention of the target vehicle.

In addition, if a new target vehicle is detected and the tracking begins, the processor 121 may set the risk adaptability model to an initial value or reset the risk adaptability model to its initial state for the newly detected target vehicle and may estimate the lane changing intention of the newly detected target vehicle through the accumulation of the driving risk data.

The vehicle controller 122 of the controller 120 may control the driving of the vehicle (host vehicle) based on the lane changing intention of the target vehicle estimated by the processor 121.

Specifically, the vehicle controller 122 may be connected with an acceleration apparatus 130 for accelerating the vehicle, a braking apparatus 140 for decelerating or stopping the vehicle, a steering apparatus 150 for controlling the driving direction of the vehicle, etc.

Accordingly, the vehicle may be accelerated or decelerated (braked) by transmitting a control signal from the vehicle controller 122 to the acceleration apparatus 130 or the braking apparatus 140, and if necessary, a steering assistance may be performed by transmitting a control signal to the steering apparatus 150.

According to the embodiment of the present disclosure as described above, since the lane changing intention of the target vehicle can be estimated with high reliability according to the probability-based risk adaptability model, it is possible to provide a method and system for estimating lane changing intention of the target vehicle for safer and less heterogeneous driving route planning.

Meanwhile, according to the prior art, there was a problem that individual differences depending on the driver could not be considered because the lane changing intention of the target vehicle was uniformly determined using the location, the speed, the heading angle, etc. of the surrounding vehicle.

On the other hand, according to the embodiments of the present disclosure, since the risk adaptability model is generated differently depending on a target vehicle, and the lane changing intention is individually estimated based on the driving habits of the driver of the target vehicle, it is possible to effectively determine the lane changing intention.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1: Vehicle (Host vehicle)
2: Target vehicle
3: First peripheral vehicle
4: Second peripheral vehicle
5: Third peripheral vehicle
10: Front camera
20: Front radar
30 (31-34): Corner radar
100: System for estimating lane changing intention
110: Sensor
120: Controller
121: Processor
122: Vehicle controller
130: Acceleration apparatus
140: Braking apparatus
150: Steering apparatus

What is claimed is:

1. A method for estimating a lane changing intention of a target vehicle, comprising:
- detecting the target vehicle and at least one peripheral vehicle of the target vehicle using at least one sensor installed at a host vehicle;
- accumulating driving risk data of the target vehicle with respect to the at least one peripheral vehicle while the target vehicle is driving straight;
- determining whether the driving risk data has been accumulated for a predetermined time;
- in response to the driving risk data having been accumulated for the predetermined time, generating a risk adaptability model which is a probability-based model with respect to how much risk the target vehicle takes from the at least one peripheral vehicle while driving straight based on the driving risk data;
- estimating the lane changing intention of the target vehicle based on the risk adaptability model; and
- controlling the host vehicle based on the lane changing intention of the target vehicle.

2. The method of claim 1, wherein the detecting of the target vehicle is performed by detecting a vehicle in front or in front side of the host vehicle using the at least one sensor installed at the host vehicle.

3. The method of claim 1, wherein the driving risk data is data based on a distance and a relative speed between the target vehicle and the at least one peripheral vehicle while the target vehicle is driving straight.

4. The method of claim 1, wherein the predetermined time is 5 seconds or more.

5. The method of claim 1, wherein the driving risk data is accumulated for each of the at least one peripheral vehicle of the target vehicle.

6. The method of claim 1, wherein the estimating of the lane changing intention comprises determining whether newly obtained driving risk data is fit for the risk adaptability model, and estimating that the target vehicle does not have the lane changing intention in response to the newly obtained driving risk data being fit for the risk adaptability model.

7. The method of claim 1, wherein in response to detecting that the target vehicle changed a driving lane, newly obtained driving risk data is not accumulated.

8. The method of claim 1, wherein in response to the host vehicle being unable to track the target vehicle, the estimating of the lane changing intention of the target vehicle is terminated.

9. The method of claim 8, wherein in response to the host vehicle being unable to track the target vehicle and a new target vehicle is detected and tracked, the risk adaptability model is reset to its initial state for the new target vehicle.

10. The method of claim 1, wherein in response to the host vehicle being able to track the target vehicle, the estimating of the lane changing intention of the target vehicle is repeatedly performed.

11. The method of claim 1, wherein the controlling of the host vehicle comprises an acceleration, a deceleration, or a steering, or any combination thereof.

12. A system for estimating a lane changing intention of a target vehicle, comprising:
- at least one sensor configured to detect the target vehicle and at least one peripheral vehicle of the target vehicle; and
- a controller comprising a processor configured to estimate the lane changing intention of the target vehicle and a vehicle controller configured to control a host vehicle based on the lane changing intention,
- wherein the processor is further configured to:
- accumulate driving risk data of the target vehicle with respect to the at least one peripheral vehicle while the target vehicle is driving straight;
- determine whether the driving risk data has been accumulated for a predetermined time;
- generate a risk adaptability model which is a probability-based model with respect to how much risk the target vehicle takes from the at least one peripheral vehicle while driving straight, based on the driving risk data if the driving risk data has been accumulated for the predetermined time; and
- estimate the lane changing intention of the target vehicle based on the risk adaptability model.

13. The system of claim 12, wherein the at least one sensor comprises at least one of a front camera, a front radar, and a plurality of corner radars installed at the host vehicle.

14. The system of claim 12, wherein the driving risk data is data based on a distance and a relative speed between the target vehicle and the at least one peripheral vehicle while the target vehicle is driving straight.

15. The system of claim 12, wherein the predetermined time is 5 seconds or more.

16. The system of claim 12, wherein the processor is further configured to determine whether newly obtained driving risk data is fit for the risk adaptability model, and estimate that the target vehicle does not have the lane changing intention if the newly obtained driving risk data is fit for the risk adaptability model.

17. The system of claim 12, wherein if the least one sensor detected that the target vehicle has changed a driving lane, the processor does not accumulate newly obtained driving risk data.

18. The system of claim 12, wherein if the target vehicle is unable to be tracked by the least one sensor, the processor terminates estimating the lane changing intention of the target vehicle.

19. The system of claim 18, wherein if the target vehicle is unable to be tracked by the at least one sensor and a new target vehicle is detected and tracked, the processor is configured to reset the risk adaptability model to its initial state for the new target vehicle.

20. The system of claim 12, wherein the vehicle controller is connected with an acceleration apparatus, a braking apparatus and a steering apparatus, and the vehicle controller is configured to control the host vehicle through an acceleration, a deceleration, or a steering control based on the lane changing intention of the target vehicle estimated by the processor.

* * * * *